United States Patent Office 3,293,292
Patented Dec. 20, 1966

3,293,292
BUTANE OXIDATION
Kenneth L. Olivier, Placentia, and William D. Schaeffer, Pomona, Calif., assignors to Union Oil Company of California, Los Angeles, Calif., a corporation of California
No Drawing. Filed Apr. 22, 1966, Ser. No. 544,399
8 Claims. (Cl. 260—533)

This is a continuation-in-part of my copending application Serial Number 242,903, filed December 7, 1962.

This invention relates to the liquid phase oxygen oxidation of butane to acetic acid.

We have discovered that butane can be rapidly oxidized to acetic acid in very high yields when the oxidation is conducted in liquid phase and in the presence of a cobalt, manganese and bromine catalyst.

With bromine catalysis, the oxidation of hydrocarbons is believed to be initiated by the reaction between a bromine free radical and the hydrocarbon to form hydrogen bromide and a hydrocarbon free radical which is subsequently oxidized. When the hydrocarbon to be oxidized is an alkaryl or an alkene, the hydrogen on the carbon vicinal to the aryl nucleus or to the unsaturate group is very labile and the aforementioned reaction between the bromine free radical and the hydrocarbon is quite exothermic. To illustrate, the heat of reaction between a bromine radical and a typical alkaryl (toluene) or alkene (propylene) is about 10 kilocalories per mol. Accordingly, it is not surprising to find bromine-heavy metal catalysis has been applied to the oxidation of alkaryls and alkenes.

In alkanes, however, the amount of energy required to sever carbon to hydrogen bonds is greater than that released by the formation of hydrogen bromide, so that the overall initiating reaction with bromine catalysis is endothermic. For example, the heat of reaction between butane and a bromine radical is about —0.5 kilocalorie per mol. Since this initiating step is endothermic, it would not normally be expected that bromine catalysis of the liquid phase oxidation of butane would occur.

We have found, however, that bromine very readily catalyzes the oxygen oxidation of butane to acetic acid when the oxidation is conducted in the presence of catalytic amounts of cobalt and manganese. The conditions of the oxidation are mild, preferred temperatures being between about 250° and 425° F., with preferred pressures between about 700 and about 1500 p.s.i.g., sufficient to maintain a liquid phase. The high rate of oxidation and high yields of acetic acid product is also very surprising. The oxidation proceeds so rapidly in the presence of bromine, cobalt and manganese that butane can essentially be titrated with oxygen; the supply of oxygen being controlled to prevent an excessive rise in the reactant's temperature. Finally, the yield of acetic acid from butane is quite surprising, yields of 70 mol percent or greater being readily obtained. In terms of weight percent, the aforementioned yield is 145 weight percent of the n-butane oxidized. In general, no difficulty is encountered in attaining yields in excess of 100 weight percent and yields up to about 195 weight percent are possible. In contrast, comparatively low yields of acetic acid are obtained from homologous alkanes, propane and pentane.

The oxidation is performed in liquid phase, preferably with a reaction solvent or medium which is inert to oxidation and a liquid at the reaction conditions. Various organic liquids or mixtures can be used such as various aryls, e.g., benzene, diphenyl, t-butylbenzene; halogenated alkyls or aryls, e.g., chlorobenzene, o-dichlorobenzene, p-difluorobenzene, carbon tetrachloride, ethylene dichloride, trichloropropane; aromatic acids, e.g., benzoic, phthalic; saturated aliphatic acids, e.g., acetic, propionic, butyric, valeric, isovaleric, etc., or mixtures of any of the aforementioned. Of these solvents, we prefer the $C_1$ to $C_{10}$ aliphatic acids.

If desired, the liquid phase can entirely comprise butane; however, preferably the hydrocarbon is diluted to between about 10 and about 70 weight percent, preferably between about 30 and about 50 weight percent with one or more of the aforementioned solvents.

As previously mentioned, cobalt and manganese are used as co-catalysts with bromine for the oxidation. These metals can be employed as soluble organic or inorganic salts or chelates which are compatible with the reaction conditions. In general, the chloride, sulfate or nitrate of the metals can be used. The organic salt of various aromatic or $C_1$ to $C_{10}$ aliphatic acids can also be used, such as the acetate, formate, propionate, butyrate, isovalerate, benzoate, toluate, terephthalate, naphthenate salicylate, etc. Preferred are the metal salts of the $C_1$ to $C_5$ aliphatic acids. Chelates of the metals such as the acetyl acetonates, ethylene diamine tetraacetic acid chelates, etc., can also be used if desired.

The cobalt and manganese can be used in amounts between about 0.005 and about 0.10 molal concentrations; preferably in amounts between about 0.01 and about 0.05 molal. Preferably, equal mol proportions of the metals can be used; however, either metal can be used in amounts comprising from 10 to 90 mol percent of the total sum of cobalt and manganese present.

The oxidation is performed in the presence of catalytic amounts of bromine or bromide ion. Elemental bromine can be introduced into the liquid reaction medium to provide the desired concentration of bromine. Preferably, however, a bromine containing compound is introduced into the reaction zone, e.g., hydrogen bromide, ammonium or alkali metal bromides, e.g., sodium, potassium, cesium, or lithium bromide. Soluble metal bromides can be added such as magnesium bromide or the bromide of the aforementioned metals, i.e., cobalt bromide or manganese bromide. In general, the bromide concentration in the oxidation zone should be between about 0.01 and about 0.20 molal, preferably between about 0.02 and about 0.15 molal.

The temperature of the oxidation can be any temperature between about 150° and about 450° F., preferably between about 300° and about 400° F. The pressure is chosen sufficient to maintain liquid phase conditions at the oxidation temperature and is generally between about 500 and about 3000 p.s.i.g.; preferably between about 700 and about 1000 p.s.i.g. The oxidation proceeds very rapidly depending on the temperature of oxidation, oxygen rate, and heat removal duty. Generally reaction periods from 20 to about 200 minutes can be expected. The course of the reaction can readily be determined for any set of conditions in a manner apparent to those skilled in the art, e.g., by periodic withdrawal and analysis of the reactants or by observing the rate of oxygen absorption; a failure to absorb oxygen or a substantial decrease in absorption rate indicating completion of the oxidation.

The oxidation can be conducted on a batch or continuous basis. In a batch oxidation, the organic solvent, hydrocarbon, heavy metal catalyst and bromine compound are charged to the reactor and heated to reaction temperature. An oxygen containing gas is thereafter introduced and the heat of oxidation is removed by passing a heat exchange fluid through a cooling coil immersed in the liquid. Completion of the oxidation is apparent when oxygen is no longer observed to be absorbed in the liquid or when no exotherm occurs with oxygen introduction. Thereafter, the crude oxidate can be removed and distilled to recover a low boiling ester fraction, water and the aliphatic acid product. The ester fraction can be returned to a subsequent oxidation step to achieve a high yield of aliphatic acid product.

In a continuous oxidation, the hydrocarbon can be charged to the oxidation zone which contains the organic solvent, heavy metal and bromine catalysts. Air or other oxygen containing gas is introduced into the liquid phase while a heat exchange fluid is circulated through a coil in the liquid phase to maintain the desired reaction temperature. Other cooling techniques can of course be used, e.g., recycling of a cooled condensate or recycle liquid. A stream of crude oxidate is continuously withdrawn and passed into a distillation tower where the low boiling ester fraction, methyl and ethyl acetates, is flashed off, condensed, separated from the aqueous layer in the condensate and recycled to the oxidation zone. The acetic acid can be recovered in a high degree of purity as a distillate from the crude oxidate to leave the reaction solvent and catalyst salts as a residue for recycle to the oxidation. Make up catalyst, e.g., ammonium bromide and/or heavy metal salts can be added as needed to maintain their aforementioned concentration in the oxidation zone.

The acetic acid in the distillate can be readily recovered in a high purity by various known purification steps. Preferably, the distillate is admixed with a material which forms an azeotrope with water and distilled to remove water. The azeotrope is condensed and separated into an aqueous and organic layer and the latter is recycled to be admixed with fresh quantities of crude distillate. Examples of suitable azeotrope formers are: benzene, toluene, methyl and ethyl ketone, butyl acetate, etc. Benzene is preferred for this use and is used in amounts between about 1 and 20 parts per part of distillate.

The following examples will illustrate our invention:

Example 1

A solution comprising 500 grams of acetic acid, 3 grams of cobalt acetate tetrahydrate, 3 grams of manganese acetate tetrahydrate and 3 grams of ammonium bromide were added to a 1-gallon autoclave. The autoclave was equipped with a thermocouple, stirrer and a cooling coil beneath the normal liquid level. To the solution was added 286 grams of n-butane and the solution was heated to about 350° F. The autoclave was pressured to 900 p.s.i.g. with nitrogen and thereafter oxygen was slowly introduced at a rate sufficient to maintain a pressure at about 930 p.s.i.g.

After 2.5 hours, no exotherm was observed with oxygen addition, indicating completion of the oxidation. The autoclave was cooled and its contents transferred to a fractionation column from which a low boiling ester fraction composed chiefly of methyl, ethyl and sec-butyl acetates was separated in an amount comprising about 12.8 mol percent of the butane converted. Acetic acid in excess of the 500 grams initially employed as solvent was collected as a distillate in greater than 99 percent purity and comprised about 80.6 mol percent yield. About 6.4 mol percent of the butane charge was oxidized to carbon dioxide. The ester fraction was returned to subsequent oxidation with a fresh charge of butane and the distribution of products was not altered, indicating that an ultimate yield of at least 93 mol percent acetic acid from butane is possible by our oxidation method.

Example 2

The oxidation was repeated in separate experiments on propane, butane and pentane, however the ammonium bromide was omitted. The remainder of the procedure was otherwise identical to Example 1. The rate of oxidation was extremely slow and after two hours an insufficient amount of oxidized product was obtained to permit its fractionation. These experiments demonstrate the essential nature of bromine compounds to the catalysis.

Example 3

The oxidation of Example 1 was again repeated in separate experiments on propane, butane and pentane, following the same procedure with ammonium bromide, but without the heavy metal catalysts and, again, the rate of oxidation was so slow that after two hours there was an insufficient amount of product to recover by fractionation in each of the experiments. These experiments demonstrate the essential nature of cobalt and manganese to the oxidation.

Example 4

Example 1 was repeated with a charge of 200 grams of pentane. The oxidation rate was observed to be slower and was completed only after four hours. The yield of acetic acid was only 52.6 mol percent. Propionic acid (17.6 mol percent yield), butyric acid (3.4 mol percent yield) and formic acid (4.6 mol percent yield) were also recovered. A low boiling ester fraction was obtained in a yield of 6.9 mol percent (calculated as ethyl acetate.) A high boiling tar fraction was recovered which comprised about 1.6 weight percent of the total oxidized carbon products.

Example 5

Example 1 was repeated with a charge of 202 grams of propane and 3 milliliters of 48 percent strength hydrobromic acid. At the end of 4½ hours the oxidation was discontinued and the autoclave contents fractionated to recover the products. The yield of acetic acid was 52.5 mol percent, of formic acid was 15.8 mol percent, of carbon dioxide was 21.6 mol percent and of ester products was 10.0 mol percent.

A comparison of Examples 1, 4 and 5 demonstrates the unexpectedly higher yields of acetic acid which can be obtained from butane than from its adjacent homologs, propane and pentane.

Example 6

Example 1 was repeated with butane and the identical procedure except the cobalt salt was omitted from the catalyst solution. No reaction occurred after one hour when the experiment was discontinued. The procedure of Example 1 was also repeated on a butane charge, except the manganese salt was omitted from the catalyst solution. Again, no oxidation occurred after 1 hour when the experiment was discontinued.

The preceding example demonstrates that both cobalt and manganese salts should be present during the oxidation.

The preceding exemplified disclosure of our invention is intended only to illustrate our invention and is not to be unduly limiting of the process as defined by the steps and their equivalents set forth in the following claims.

We claim:

1. The oxidation of normal butane to acetic acid which comprises contacting a hydrocarbon consisting essentially of normal butane with oxygen in a liquid phase reaction zone in the presence of an organic reaction solvent inert to said oxidation containing catalytic amounts of bromine between about 0.005 and about 0.10 molal of a cobalt salt soluble in said reaction solvent and between about 0.005 and about 0.10 molal of a manganese salt soluble in said organic reaction solvent at a temperature between about 150° and 450° F. and sufficient pressure to maintain said organic reaction solvent in liquid phase.

2. The process of claim 1 wherein acetic acid is employed as the reaction solvent.

3. The oxidation of normal butane to acetic acid which comprises contacting normal butane with oxygen in a reaction zone containing acetic acid and catalytic amounts of bromine and from about 0.005 and about 0.10 molal each of cobalt and manganese acetates at a temperature between about 150° and 450° F. and a pressure sufficient to maintain a liquid phase.

4. The oxidation of claim 1 wherein said reaction solvent comprises an aliphatic carboxylic acid having from 1 to about 10 carbons.

5. The oxidation of claim 3 wherein said bromine is present in a concentration between about 0.01 and 0.20 molal and each of said cobalt and manganese are present in concentrations from 0.01 to 0.05 molal.

6. The oxidation of claim 1 wherein said acetic acid is obtained in a yield greater than 100 weight percent of the n-butane oxidized.

7. The oxidation of claim 1 wherein a crude oxidate is withdrawn from the reaction zone and distilled to separate volatile ester byproducts from the acetic acid and wherein the ester byproducts are returned to the reaction zone to increase the yield of acetic acid.

8. The oxidation of claim 1 where a crude oxidate is withdrawn from the reaction zone and the acetic acid is recovered therefrom by azeotropic distillation.

References Cited by the Examiner

UNITED STATES PATENTS

| | | | |
|---|---|---|---|
| 2,800,504 | 7/1957 | Elce et al. | 260—533 |
| 3,247,249 | 4/1966 | Saffer et al. | 260—533 |

FOREIGN PATENTS 572,710   5/1959   Belgium.

R. K. JACKSON, *Primary Examiner.*

S. B. WILLIAMS, *Assistant Examiner.*